US011009687B2

(12) United States Patent
Sedazzari et al.

(10) Patent No.: US 11,009,687 B2
(45) Date of Patent: May 18, 2021

(54) TELECENTRIC LENS

(71) Applicant: OPTO ENGINEERING S.r.l., Mantova (IT)

(72) Inventors: Claudio Sedazzari, Mantova (IT); Andrea Bertolucci, Mantova (IT)

(73) Assignee: OPTO ENGINEERING S.r.l., Mantova (IT)

( * ) Notice: Subject to any disclaimer, the term of this patent is extended or adjusted under 35 U.S.C. 154(b) by 120 days.

(21) Appl. No.: 16/461,450

(22) PCT Filed: Nov. 29, 2017

(86) PCT No.: PCT/IT2017/000271
§ 371 (c)(1),
(2) Date: May 16, 2019

(87) PCT Pub. No.: WO2019/106698
PCT Pub. Date: Jun. 6, 2019

(65) Prior Publication Data
US 2020/0271905 A1   Aug. 27, 2020

(51) Int. Cl.
*G02B 13/22* (2006.01)
*G02B 17/08* (2006.01)

(52) U.S. Cl.
CPC ......... *G02B 13/22* (2013.01); *G02B 17/0812* (2013.01)

(58) Field of Classification Search
CPC .......................... G02B 13/22; G02B 17/0812
USPC ....................................................... 359/663
See application file for complete search history.

(56) References Cited

U.S. PATENT DOCUMENTS

| | | | | |
|---|---|---|---|---|
| 3,404,352 A | * | 10/1968 | Bowness | H01S 3/086 372/107 |
| 5,058,993 A | * | 10/1991 | Wakugawa | G02B 7/183 359/896 |
| 5,668,673 A | * | 9/1997 | Suenaga | G02B 17/0828 359/364 |

(Continued)

FOREIGN PATENT DOCUMENTS

| WO | 2016/147071 A | 9/2016 | |
|---|---|---|---|
| WO | WO-2016147071 A1 * | 9/2016 | ........... G02B 17/023 |

OTHER PUBLICATIONS

Anon.:"Mirrors: Coating Choice Makes a Difference: Optical Materials & Coatings' Photonics Handbook", 1 Photonic Handbook, Mar. 8, 2009(Mar. 8, 2009).

(Continued)

*Primary Examiner* — James R Greece
(74) *Attorney, Agent, or Firm* — Arent Fox LLP; Michael Fainberg

(57) ABSTRACT

A telecentric lens comprises a front optical group adapted to receive rays coming from an observed object, a rear optical group, adapted to convey said rays towards an image plane of a sensor, and a lens aperture positioned between the front optical group and the rear lens group, wherein the lens aperture lies on the focal plane at least of the front optical group. The front optical group is devoid of lenses and is consists of a concave curved primary mirror adapted to receive and reflect the rays coming from the observed object, and at least one secondary mirror adapted to receive and reflect towards the rear optical group the rays coming from the primary mirror.

11 Claims, 8 Drawing Sheets

(56) References Cited

U.S. PATENT DOCUMENTS

2006/0056064 A1* 3/2006 Shafer ................ G03F 7/70275
359/727

OTHER PUBLICATIONS

Anon.: "Petzval field curvature—Wikipedia", Sep. 10, 2017 (Sep. 10, 2017) Retrieved from the Internet, Aug. 8, 2018.
Brian Guenter et al: "Highly curved image sensors: a practical approach for improved optical performance", Optics Express, vol. 25, No. 12, May 30, 2017.

* cited by examiner

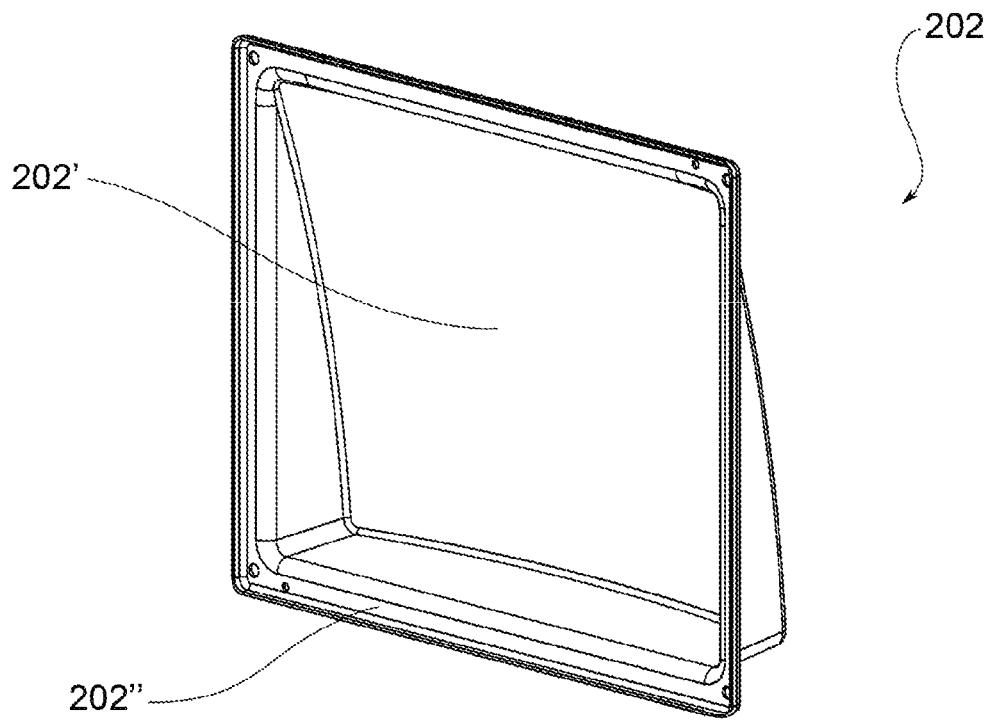
FIG.5
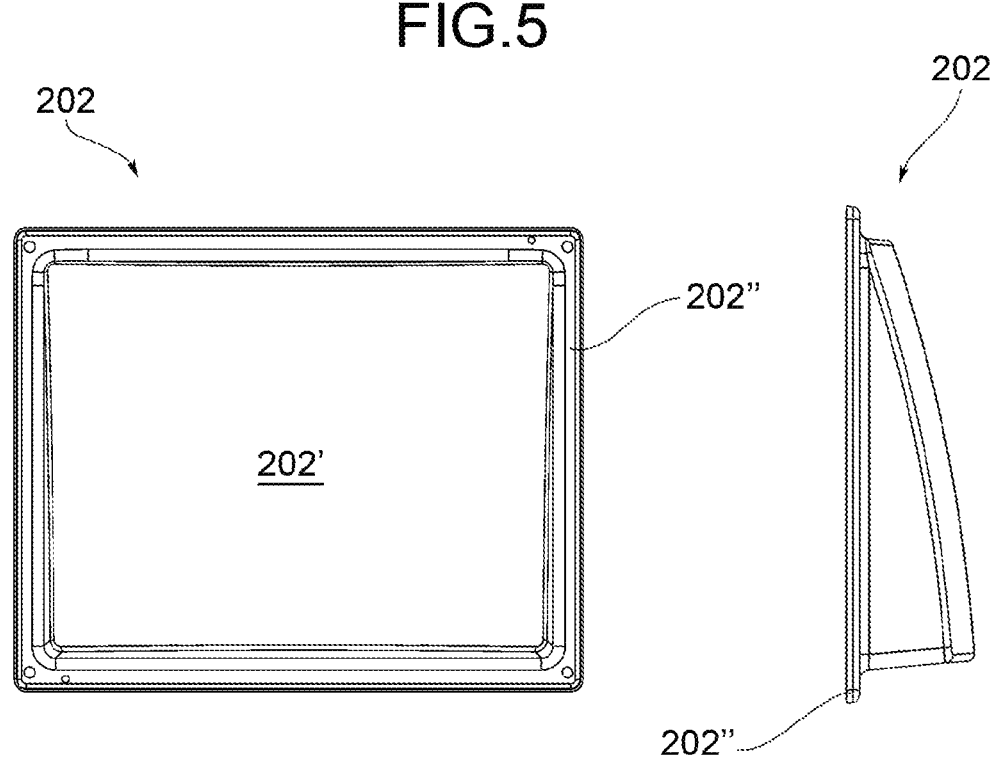
FIG.5a
FIG.5b

TELECENTRIC LENS

CROSS-REFERENCE TO RELATED APPLICATIONS

This application is a National Phase Application of PCT International Application No. PCT/IT2017/000271, International Filing Date, Nov. 29, 2017 which is hereby incorporated by reference in its entirety.

FIELD OF INVENTION

The present invention relates to a telecentric lens to be used in an appliance for artificial vision, in particular for performing dimensional measurements of objects.

BACKGROUND OF THE INVENTION

Telecentric lens are optical systems widely used in the field of artificial vision to perform the contactless measurement of objects due to their specific properties to collect cones of light rays coming from the illuminated object whose axis, or main beam, is parallel to the axis of the optical system itself. In this way, in fact, the size of the image created by the lens is independent of the distance at which the observed object is placed and this allows a more accurate measurement thereof, as it is devoid of the characteristic perspective effects of any other type of optics.

This property, called telecentricity, is implemented as is known with a lens in which the aperture pupil of the lens is placed optically at infinity, with respect to the observed object. This feature is made possible by making sure that the optical elements placed between the stop of the lens, or the lens aperture, and the observed object create as a whole an optical group with positive focal the focus position whereof coincides with the stop position.

FIG. 1 shows, following the conventions in use in optics, the diagram of a telecentric lens 100, with main optical axis k, which creates an image 50 of an object 10 of dimension y1 by means of a front optical group 20, with positive focal f1 and diameter d1, positioned so that the focus thereof coincides with the position of stop 30, and a second rear optical group 40 and placed between stop 30 and image 50.

In reality, each of the two front 20 and rear 40 optical groups consists of several optical elements (FIG. 1a), is therefore provided with a thickness and has two main planes, which define the reference planes for the computation of the optical distances between the same two groups and the other elements of the system.

In the diagram in FIG. 1, the front optical group and the rear optical group 40 are indicated with a double arrow which provides an idealized representation in which each of the two optical groups is devoid of thickness and the positions of the two main planes of each group coincide with each other and with the position of the double arrow itself. In this representation, therefore, distance f1 coincides with both the air space AS which is present between the element of the front optical group 10 closest to stop 30 and stop 30 itself, and with the front dimensions L1, namely the distance between the outermost element of the front optical group 20, which is the element of said group closest to object 10, and the position of stop 30.

According to a particular embodiment of this scheme, it is possible to obtain a bi-telecentric lens, or a lens in which the cones of rays incident on the image plane 50 have their axis or main beam parallel to the main optical axis k.

The realization of telecentric lens is only possible if at least one optical element forming part of the front optical group 20 has a diameter d1 greater than the maximum dimension y1 of the observed object 10. This condition is necessary so that the front optical group 20 is able to collect the rays coming from object 10. In common practice, d1 can be considered as the maximum diameter of one or more lenses that are part of the front optical group 10.

It should be noted that, with increasing dimension y1 of object 10, dimension d1 as well as the focal length f1 increase. Since an increase in the focal length f1 involves an increase of the front dimension L1, the result is that as the size of the object observed increases, the lens will become larger in diameter and length.

This adds up to the fact that the end part of the telecentric lens, in the vicinity of the rear optical group 40 and the plane where image 50 is formed is normally connected to a camera 60, which contributes to further increase the overall length of the assembly.

The reduction in weight, size and cost of telecentric lenses is a recurring request of manufacturers of artificial vision systems.

SUMMARY OF THE INVENTION

The object of the present invention is to meet such a request by proposing a telecentric lens having lower weight, overall size and manufacturing costs compared to the telecentric lenses according to the prior art described above, without, however, worsening the optical performance of the lens.

This objects is achieved with a telecentric lens comprising a front optical group adapted to receive rays coming from an observed object, a rear optical group, adapted to convey said rays towards an image plane of a sensor, and a lens aperture positioned between the front optical group and the rear optical group, wherein the lens aperture lying on the focal plane at least of the front optical group, wherein the front optical group is devoid of lenses and consists of a concave curved primary mirror adapted to receive and reflect the rays coming from the observed object, and at least one secondary mirror adapted to receive and reflect towards the rear optical group the rays coming from the primary mirror.

BRIEF DESCRIPTION OF DRAWINGS

The features and the advantages of the telecentric lens according to the invention shall be made readily apparent from the following description of preferred embodiments thereof, provided purely by way of a non-limiting example, with reference to the accompanying figures, in which:

f. FIGS. 5, 5a and 5b show a perspective, front and side view of an example of a primary mirror of the telecentric lens according to the invention; and g.

Figure 1:
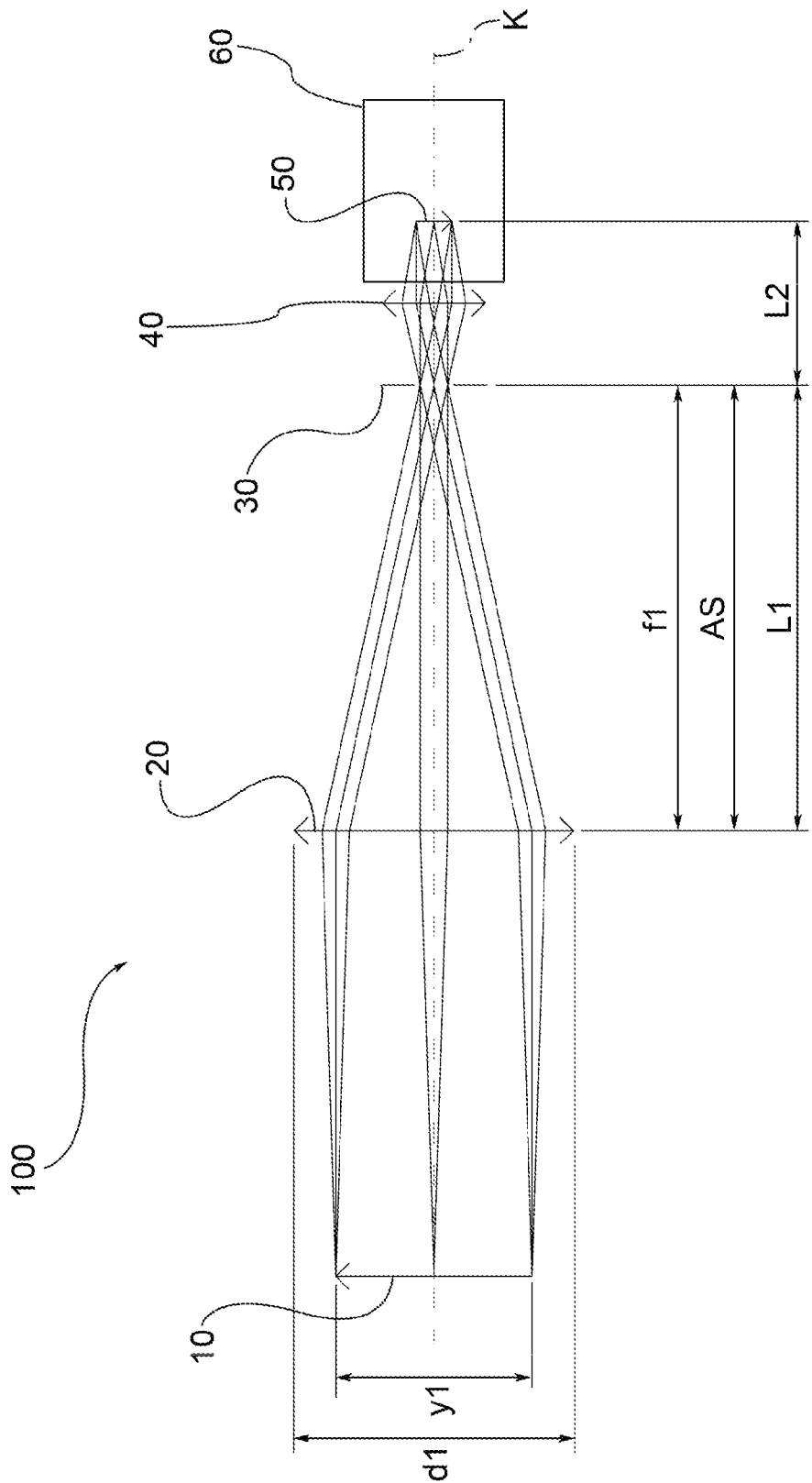
FIG. 1 shows the optical diagram of a telecentric lens made according to the prior art.
Figure 1A:
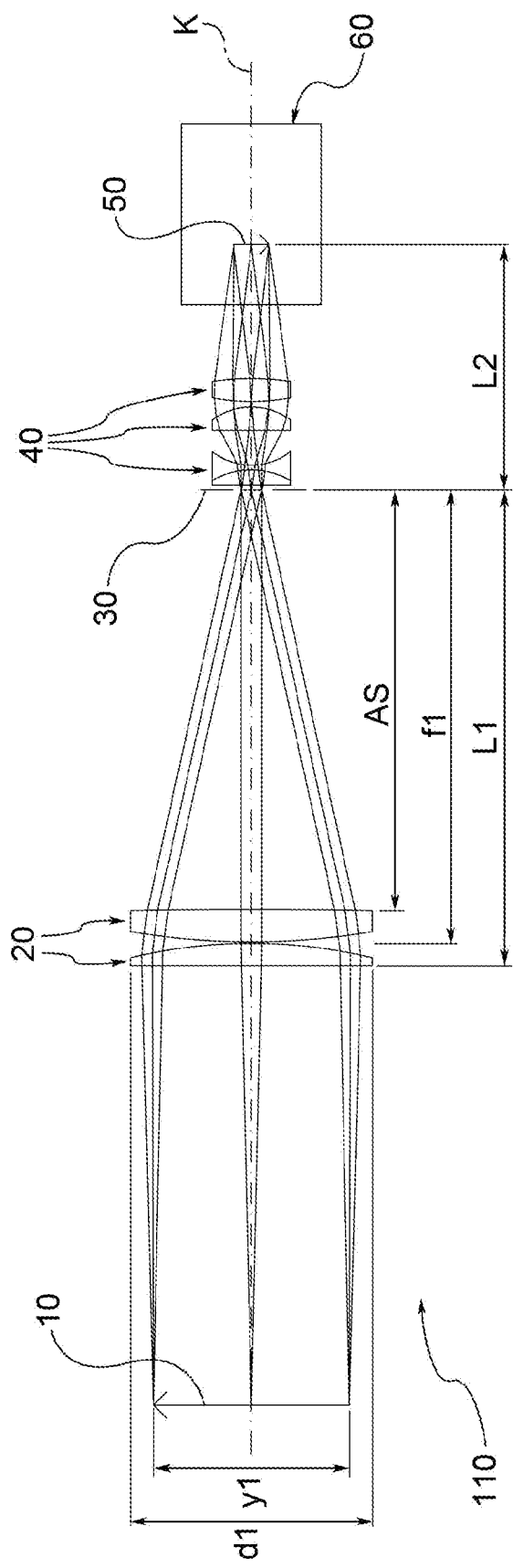
FIG. 1a shows an embodiment of a telecentric lens according to the prior art.
Figure 2:
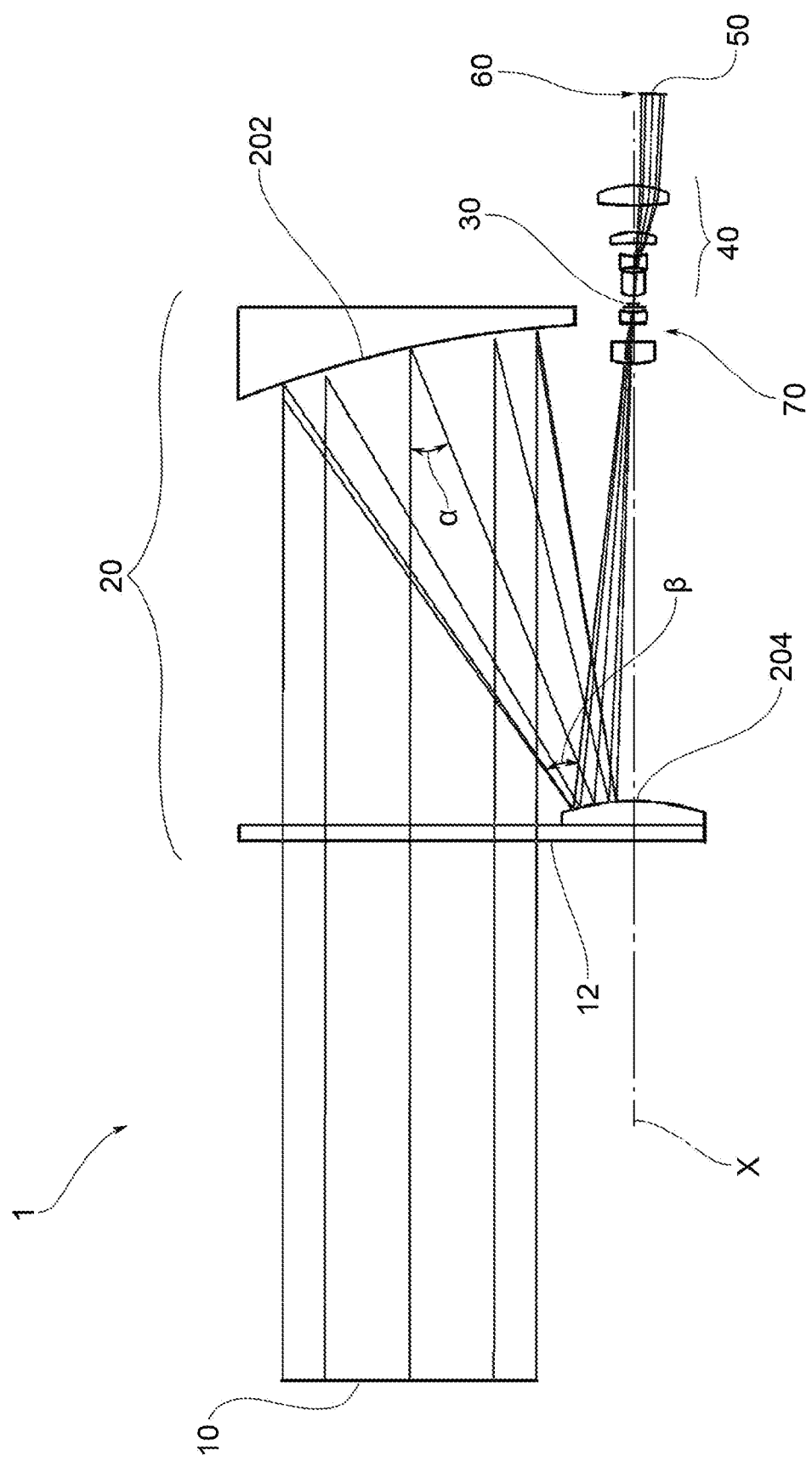
FIG. 2 shows the optical scheme of a telecentric lens according to the invention in a first embodiment thereof.

In said drawings, reference numeral 1 indicates a telecentric lens according to the invention as a whole.

DETAILED DESCRIPTION

According to a general embodiment, a telecentric lens comprises a front optical group 20 adapted to receive rays coming from an observed object 10, a rear optical group 40, adapted to convey said rays towards a sensor 60, and a lens aperture 30 positioned between the front optical group 20 and the rear lens group 40.

Figure 3:
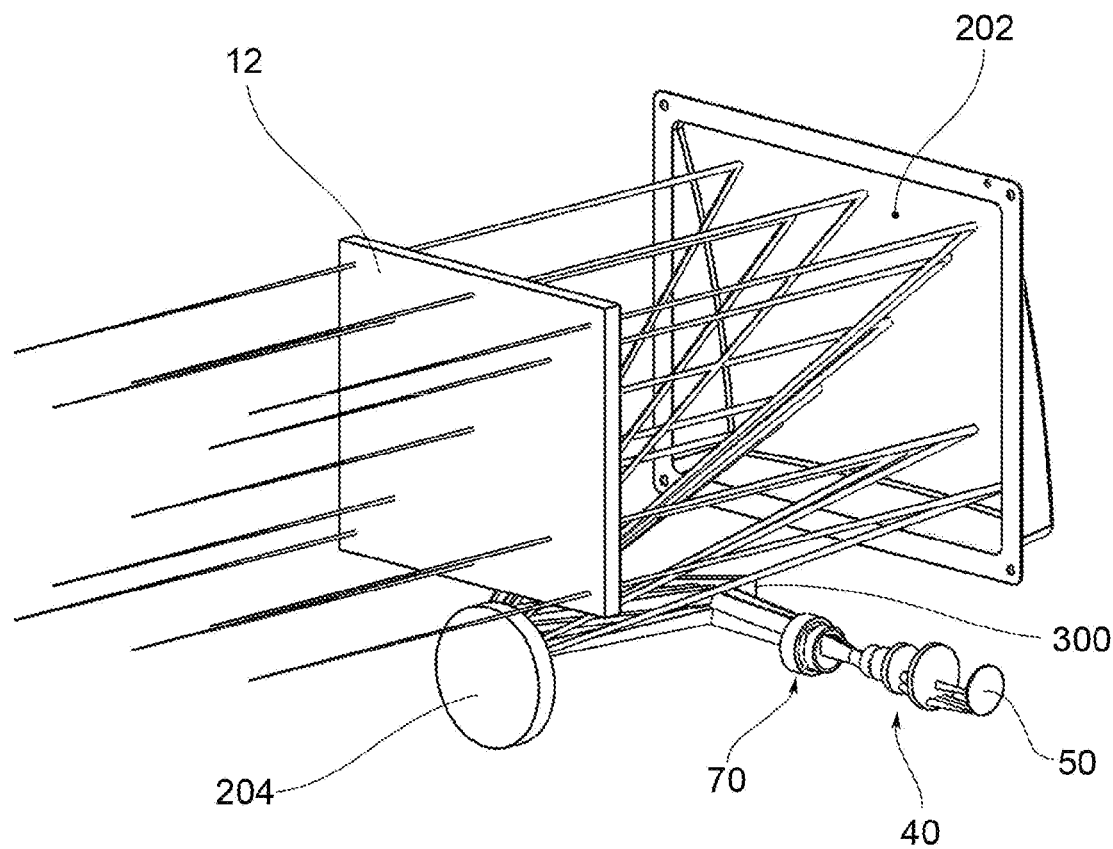
FIGS. 3 and 3a show a perspective view and a plan view of the optical scheme of a telecentric lens according to the invention in an embodiment variant.

The lens aperture 30 lies on the focal plane at least of the front optical group 20, in such a way that the axis of each cone of rays coming from the observed object 10 is parallel to the optical axis x, where by optical axis it is meant the common axis of rotation of the optical elements of the lens (unless there are reflections between the front optical group 20 and the rear optical group 40, as in the optical scheme in FIG. 3).

An image of object 10 is formed on an image plane 50 of sensor 60.

According to an aspect of the invention, the front optical group 20 is devoid of lenses and consists of a concave curved primary mirror 202 adapted to receive and reflect the rays coming from the observed object, and at least one secondary mirror 204 adapted to receive and reflect towards the rear optical group 40 the rays coming from the primary mirror 202.

In other words, the front lenses (large, expensive and heavy) that normally form the front optical group have been replaced by two mirrors 202, 204, at least the first of which has power, or curved.

In some embodiments, the primary mirror 202 is obtained from a peripheral portion of a spherical or aspherical mirror.

In an aspherical mirror, the aspherical surface is defined as a surface the profile whereof is neither a portion of a sphere nor a cylinder with a circular base.

A mathematical definition of aspherical surface is given by the formula:

$$z(y) = \frac{Cy^2}{1 + \sqrt{1 - (1+K)C^2 y^2}} + Ay^4 + By^6 + \ldots$$

where C is the curvature and is defined as C=1/R with R radius of curvature, K is the conic constant, A and B are coefficients, y is the coordinate along the axis of revolution (which in this case coincides with the optical axis x) and z is the radial axis perpendicular to the optical axis.

For example, the reflective surface of the primary mirror 202 is an ellipsoidal or spherical or aspherical cap portion.

In some embodiments, the secondary mirror 204 is obtained from a portion of a convex spherical or aspherical mirror or from a portion of a flat mirror.

In one embodiment, the telecentric lens is provided with a protective window 12 placed in front of the front optical group 20.

In one embodiment, the reflection angles α between the primary mirror and the secondary mirror are between 5 and 45 degrees.

In one embodiment, the reflection angles β between the secondary mirror and the rear optical group are between 5 and 45 degrees.

Such angles allow obtaining a good compromise between the optical quality of the lens and the compactness thereof.

Figure 3A:
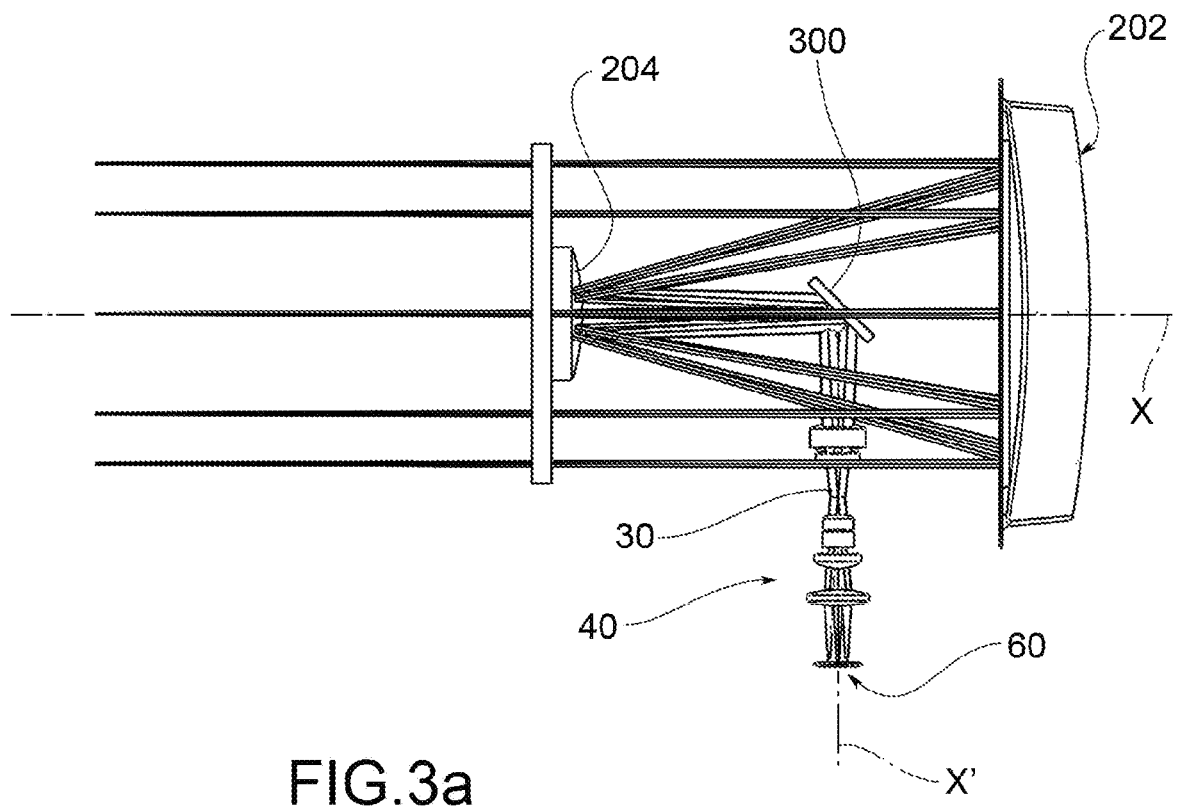
Figure 4:
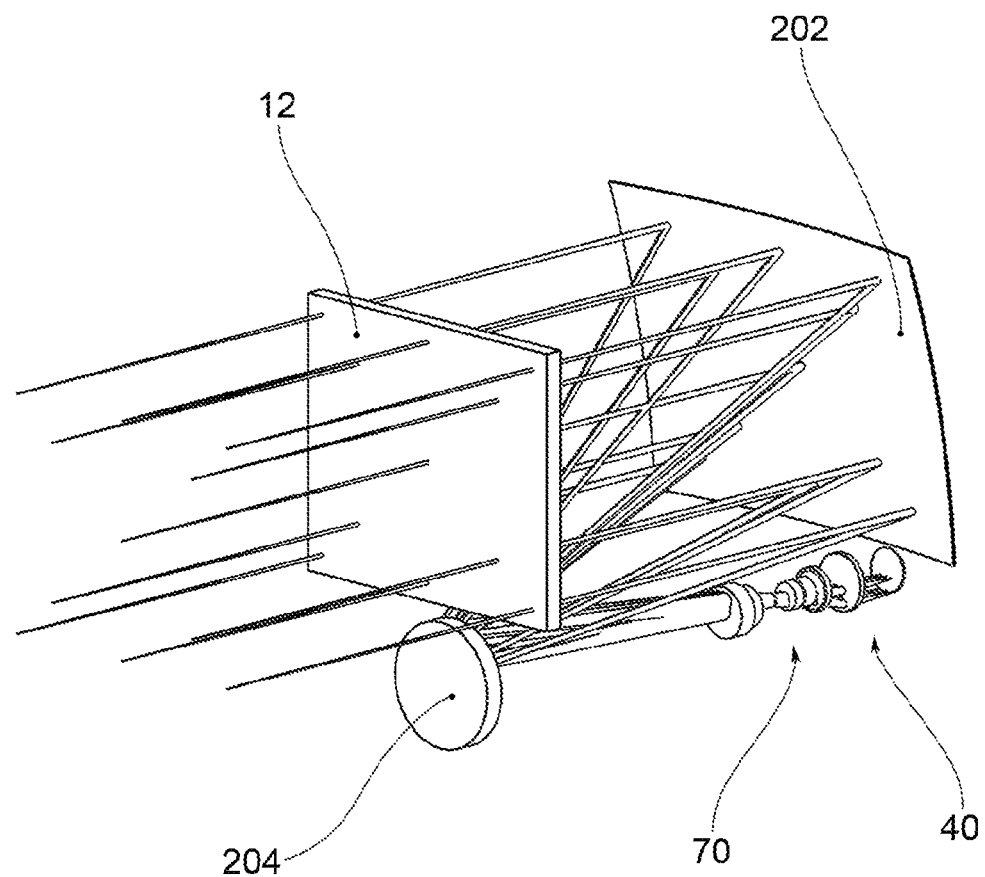
FIG. 4 shows a three-dimensional model of the optical scheme in FIG. 2.

In one embodiment shown in FIGS. 3 and 3a, the telecentric lens further comprises at least one flat mirror 300 between the secondary mirror 204 and the rear optical group 40. This flat mirror 300 is adapted to further deviate the rays so as to reduce the overall length of the lens. In this case, the optical group 40 has an optical axis x' that is inclined, for example orthogonal, with respect to the optical axis X as defined above.

In one embodiment, in front of the lens aperture 30 there is an optical compensation group 70, comprising at least one compensation lens, adapted to converge towards the rear optical group 40 any diverging rays exiting from the secondary mirror 204.

In one embodiment, the telecentric lens 1 comprises sensor 60 defining the image plane 50 on which the rays coming from the rear optical group 40 are conveyed. The image plane may be orthogonal or have a different inclination with respect to the optical axis x; x' of the rear optical group 40. The effect of the sensor plane inclined by an angle other than 90° is to reduce the aberrations due to the field curvature.

It should be noted that in a telecentric lens, where the object is located close to the lens and not at infinity, it is not possible to insert the secondary mirror along the optical axis of the primary mirror as it would completely block the rays coming from the object. An image with a large circular central obstruction would thus be obtained.

Hence the need to create a decentralized system, in which the primary mirror 202 is configured in such a way as to reflect the rays, causing them to converge on a secondary mirror 204 which is positioned externally and eccentrically with respect to the beam of rays collected by the primary mirror 202.

This configuration introduces aberrations that have been corrected preferably using elliptical or aspherical mirrors, any compensation lenses before the lens aperture and if necessary, an inclined image plane.

In one embodiment, the main mirror may be made with CNC technology or electroforming or other techniques. The advantage of electroforming is to be more cost-effective compared to a higher initial cost for the creation of the master. Electroforming also advantageously allows creating complex shapes, which may further comprise a reference and mounting surface.

In the example in FIGS. 5-5b, a primary mirror 202 comprises, around the curve and concave reflective surface 202', a flat peripheral plate 202" that serves as a reference and mounting surface. In this example, the primary mirror 202 is made by electroforming in one piece.

An electroformed mirror may be made of nickel, but it may also be made of copper or other metals. The reflecting surface is coated for example with a layer of reflective material (such as aluminium or silver and typically an anti-oxidant layer).

Figure 6:
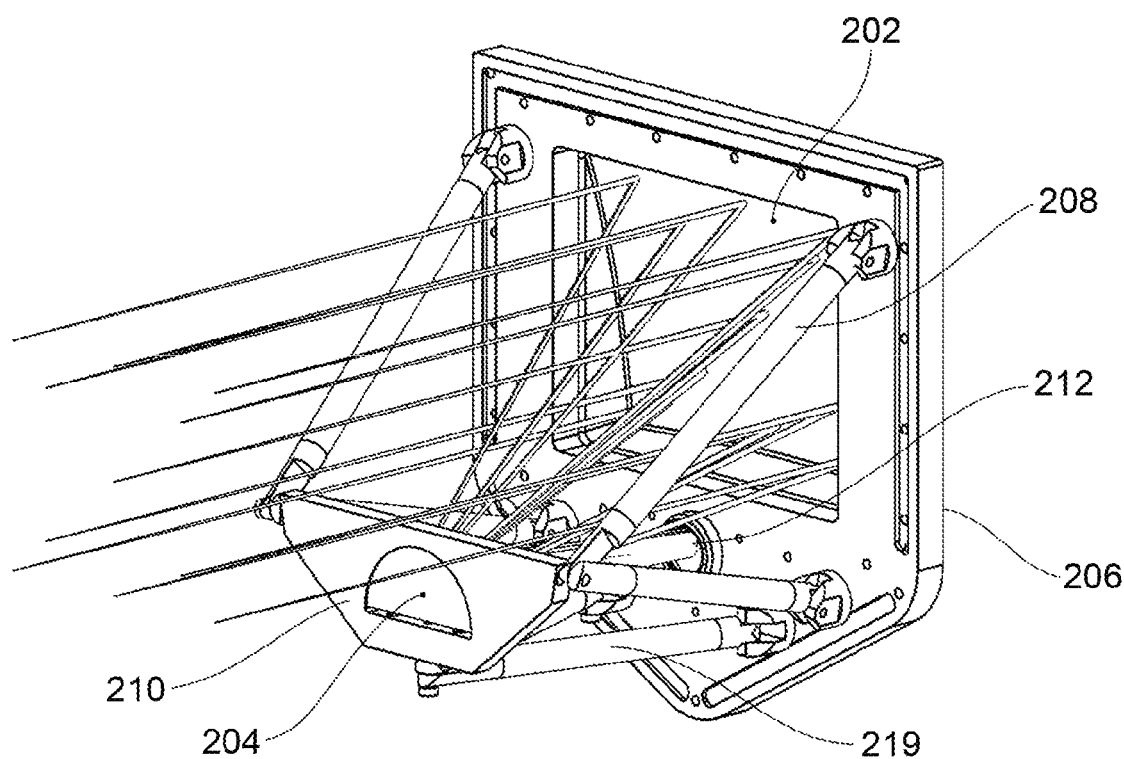
FIGS. 6-6c are as many views of an example of mechanical configuration of the telecentric lens according to the invention.
Figure 6A:
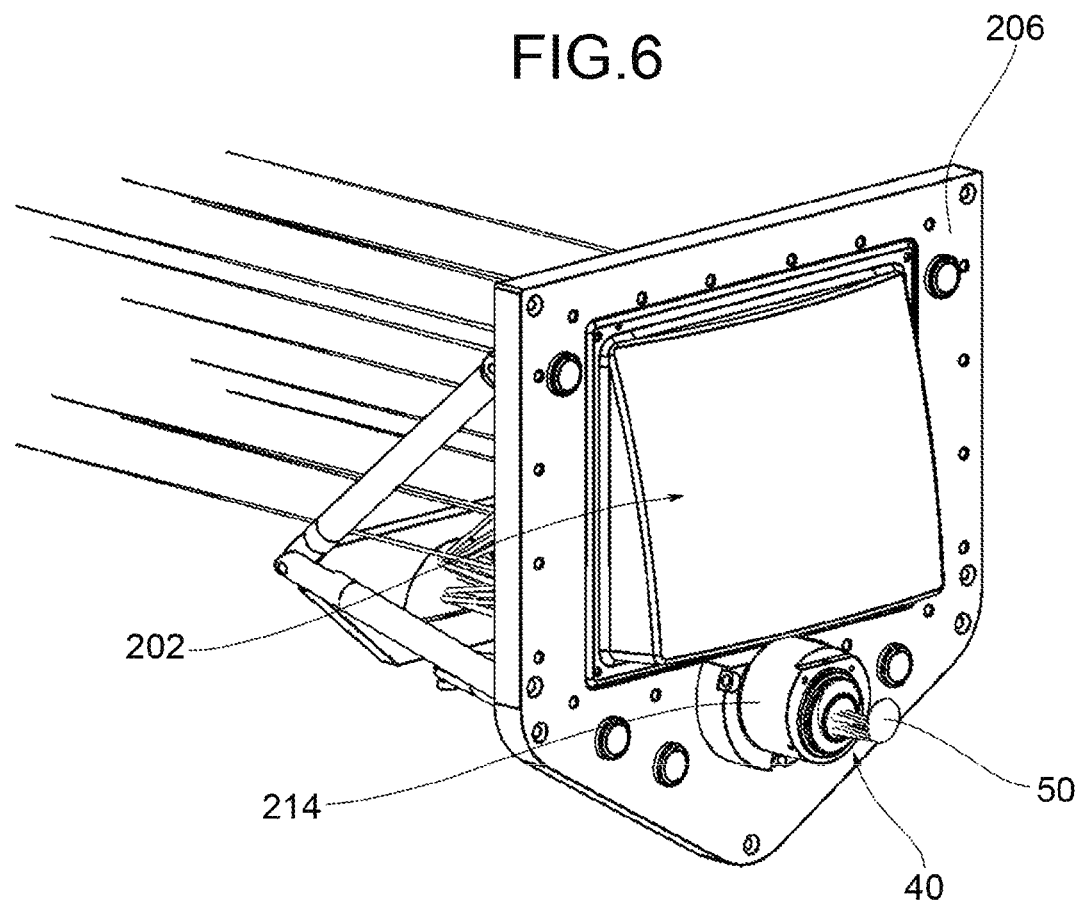
Figure 6B:
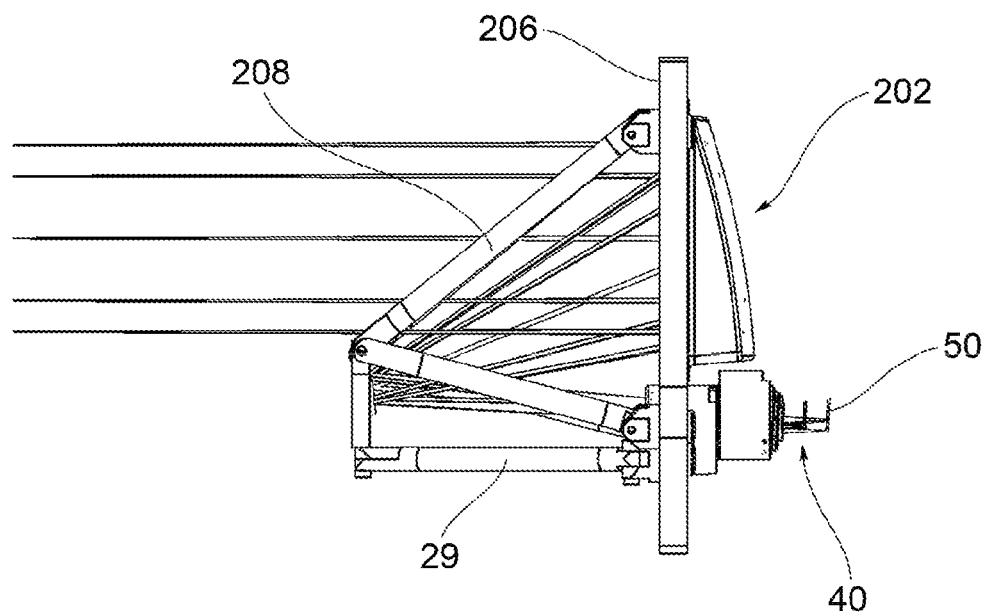
Figure 6C:
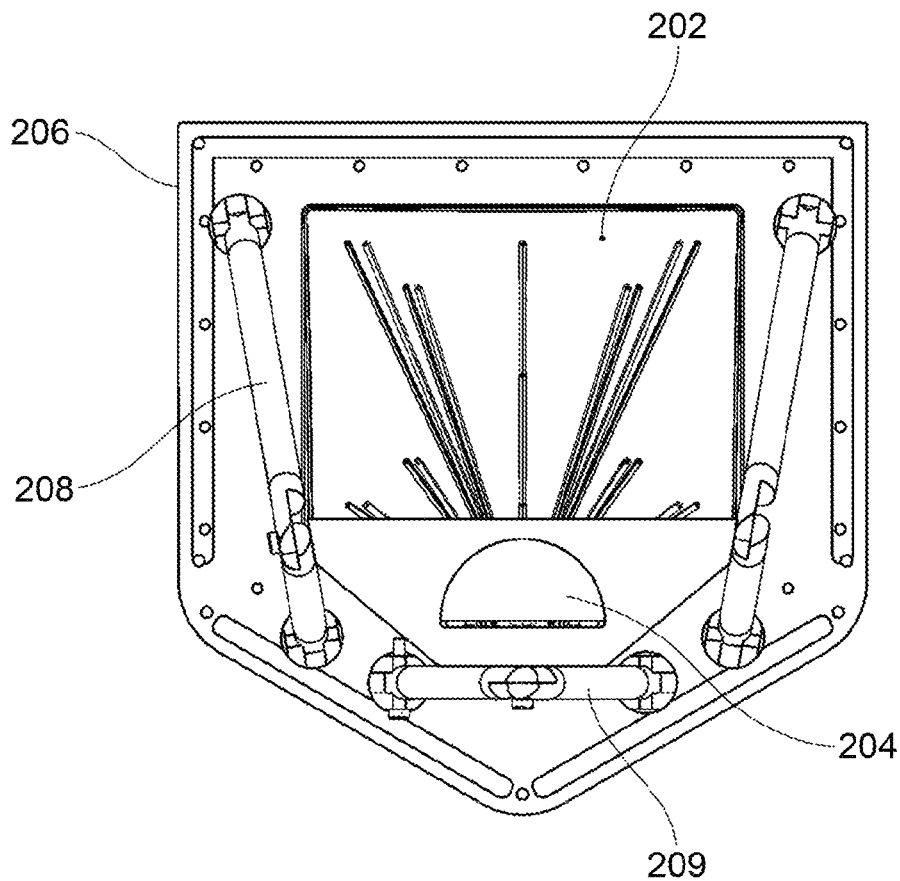

FIGS. 6-6c show an example of mechanical mounting and positioning configuration of the primary and secondary mirrors 202, 204 and of the rear optical group 40.

It is noted in particular that the primary mirror 202, such as the electroformed mirror shown in FIGS. 5-5b, is mounted, by means of the reference and mounting plate 202" thereof, on a main plate 206. Support arms 208, 209 are further attached to this main plate 206 which stably retain a secondary plate 210 which supports the secondary mirror 204.

Such support arms 208, 209 may for example be articulated arms and/or be provided with articulated connecting joints so as to allow an adjustment of the position of the secondary plate 210 and thus of the secondary mirror 204 with respect to the primary mirror 202.

An aperture 212 is further shown in a bottom part of the main plate 206, through which the rays transmitted by the secondary mirror 204 to the rear optical group 40 can pass.

In one embodiment, the rear optical group 40 is incorporated in a mechanical support structure 214, also known as "eyepiece" in jargon, which in this case is inserted in aperture 212 through a cylindrical coupling and attached to the main plate 25, for example by screws.

A man skilled in the art may make several changes, adjustments and replacements of elements with other functionally equivalent ones to the embodiments of the telecentric lens according to the invention in order to meet incidental needs, without departing from the scope of the following claims. Each of the features described as belonging to a possible embodiment can be obtained independently of the other embodiments described.

The invention claimed is:

1. A telecentric lens, comprising a front optical group adapted to receive rays coming from an observed object, a rear optical group, adapted to convey said rays towards an image plane of a sensor, and a lens aperture positioned between the front optical group and the rear optical group, wherein the lens aperture lying on the focal plane at least of the front optical group, wherein that the front optical group is devoid of lenses and consists of a concave curved primary mirror adapted to receive and reflect the rays coming from the observed object, and at least one secondary mirror adapted to receive and reflect towards the rear optical group the rays coming from the primary mirror, characterized in that the reflective surface of the primary mirror comprises an ellipsoidal cap portion.

2. Telecentric lens according to claim 1, wherein the secondary mirror is obtained from a portion of a convex spherical or aspherical mirror or from a portion of a flat mirror.

3. Telecentric lens according to claim 1, wherein the reflection angle between the primary mirror and the secondary mirror is between 5 and 45 degrees.

4. Telecentric lens according to claim 1, wherein the reflection angle between the secondary mirror and the rear optical group is between 5 and 45 degrees.

5. Telecentric lens according to claim 1, further comprising at least one flat mirror between the secondary mirror and the rear optical group, said flat mirror being adapted to further deflect the rays so as to reduce the lens length.

6. Lens according to claim 1, comprising an optical compensation group placed in front of the lens aperture and adapted to converge towards the rear optical group diverging rays exiting from the secondary mirror.

7. Telecentric lens according to claim 1, comprising a sensor defining the image plane on which the rays coming from the rear optical group are conveyed, the image plane having an inclination different from 90° with respect to the optical axis (x; x') of the rear optical group.

8. Telecentric lens according to claim 1, wherein the secondary mirror is positioned externally and eccentrically with respect to the beam of rays received from the primary mirror.

9. Telecentric lens according to claim 1, wherein the primary mirror comprises, around the curve and concave reflective surface, a flat peripheral plate that serves as a reference and mounting surface.

10. Telecentric lens according to claim 1, wherein the peripheral reference and mounting plate is mounted on a main plate to which are fixed support arms of a secondary plate which supports the secondary mirror.

11. Telecentric lens according to claim 9, wherein an aperture is formed in the main plate for the passage of the rays transmitted by the secondary mirror to the rear optical group.

* * * * *